United States Patent
Zebian et al.

(10) Patent No.: US 10,590,799 B2
(45) Date of Patent: Mar. 17, 2020

(54) AIRCRAFT TURBOMACHINE COMPRISING A COMPARTMENT EQUIPPED WITH A VENTILATION ASSEMBLY

(71) Applicant: Airbus Operations SAS, Toulouse (FR)

(72) Inventors: Maxime Zebian, Sauveur (FR); Ali Kapekov, Paris (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 36 days.

(21) Appl. No.: 16/162,710

(22) Filed: Oct. 17, 2018

(65) Prior Publication Data
US 2019/0120082 A1 Apr. 25, 2019

(30) Foreign Application Priority Data

Oct. 24, 2017 (FR) ..................................... 17 60009

(51) Int. Cl.
*F01D 25/14* (2006.01)
*F02C 7/18* (2006.01)
(Continued)

(52) U.S. Cl.
CPC ........... *F01D 25/14* (2013.01); *F01D 17/085* (2013.01); *F01D 25/12* (2013.01); *F02C 7/18* (2013.01);
(Continued)

(58) Field of Classification Search
CPC ........ F01D 17/085; F01D 25/12; F01D 25/14; F02C 7/18; F05D 2260/20; F05D 2260/608; F05D 2270/42; F05D 2300/505
See application file for complete search history.

(56) References Cited

U.S. PATENT DOCUMENTS

| 4,296,599 A | 10/1981 | Adamson |
| 6,349,899 B1 * | 2/2002 | Ralston ................. B64D 33/02 |
| | | 244/53 B |

(Continued)

FOREIGN PATENT DOCUMENTS

| EP | 1610606 A1 | 12/2005 |
| EP | 2642083 A2 | 9/2013 |

(Continued)

OTHER PUBLICATIONS

French Search Report; priority document.

*Primary Examiner* — Igor Kershteyn
(74) *Attorney, Agent, or Firm* — Greer, Burns & Crain, Ltd.

(57) ABSTRACT

A turbomachine of bypass type comprising a nacelle defining a fan duct with an interduct. The turbomachine comprises at least one compartment created in the thickness of the interduct or of the nacelle. The compartment is separated from the fan duct by a cold wall and comprises at least one heat-sensitive element. The compartment further is equipped with a ventilation assembly comprising at least one ventilation opening made in the cold wall in order, in use, to cause air from the fan duct to enter the compartment. Each ventilation opening comprises a passive-opening system arranged in the compartment, the system comprising a flap able to move between an open position in which the flap uncovers the opening and a closing-off position in which the flap closes off the opening, and a passive-actuation device of the flap for moving the flap between the two positions.

12 Claims, 12 Drawing Sheets

(51) Int. Cl.
  *F01D 17/08* (2006.01)
  *F01D 25/12* (2006.01)
(52) U.S. Cl.
  CPC .... *F05D 2260/20* (2013.01); *F05D 2260/608* (2013.01); *F05D 2270/42* (2013.01); *F05D 2300/505* (2013.01)

(56) References Cited

U.S. PATENT DOCUMENTS

| | | |
|---|---|---|
| 7,448,219 B2 | 11/2008 | Bowers et al. |
| 8,882,453 B2 | 11/2014 | Rousselin |
| 9,267,390 B2 | 2/2016 | Lo |
| 9,890,868 B2 | 2/2018 | Diaz et al. |
| 2009/0007567 A1* | 1/2009 | Porte ............... F02C 7/141 60/785 |
| 2009/0175718 A1* | 7/2009 | Diaz ............... F01D 25/12 415/180 |
| 2011/0277484 A1* | 11/2011 | Dominiak ........... F01D 25/12 60/801 |
| 2016/0177781 A1* | 6/2016 | Suciu ............... F02C 3/04 415/1 |
| 2017/0191372 A1 | 7/2017 | Tralshawala et al. |

FOREIGN PATENT DOCUMENTS

| | | |
|---|---|---|
| WO | 2010103054 A1 | 9/2010 |
| WO | 2015042398 A1 | 3/2015 |

* cited by examiner

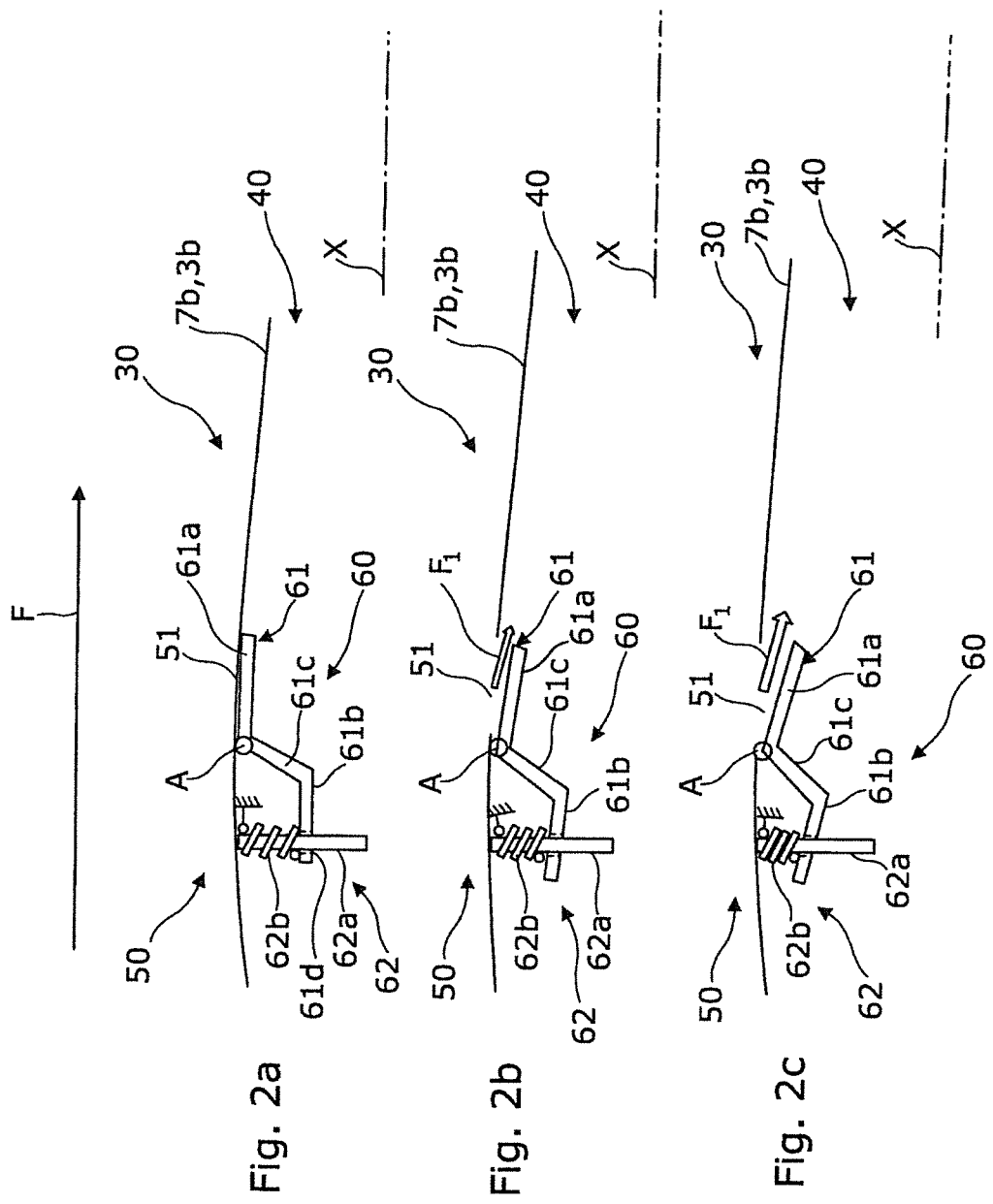

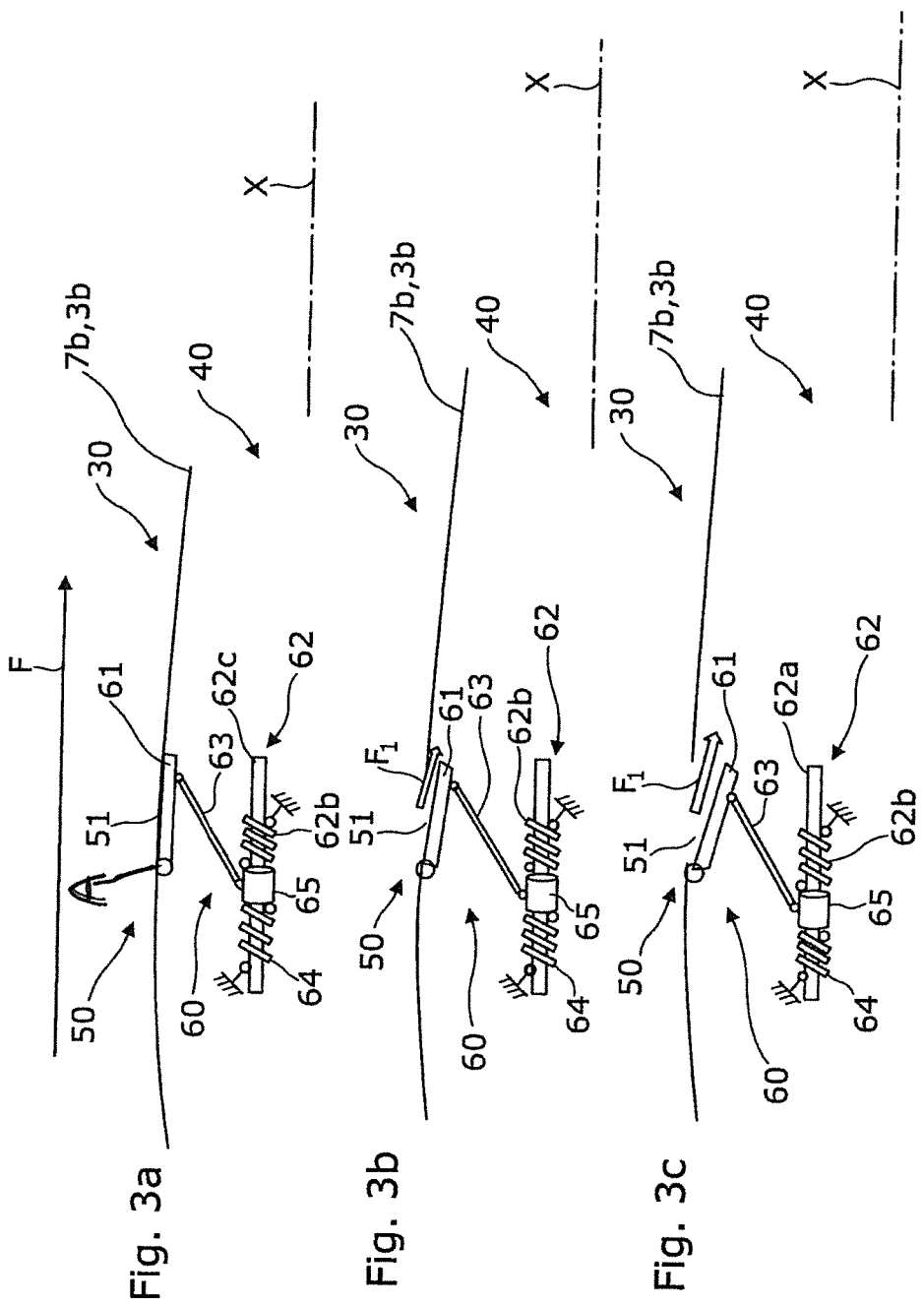

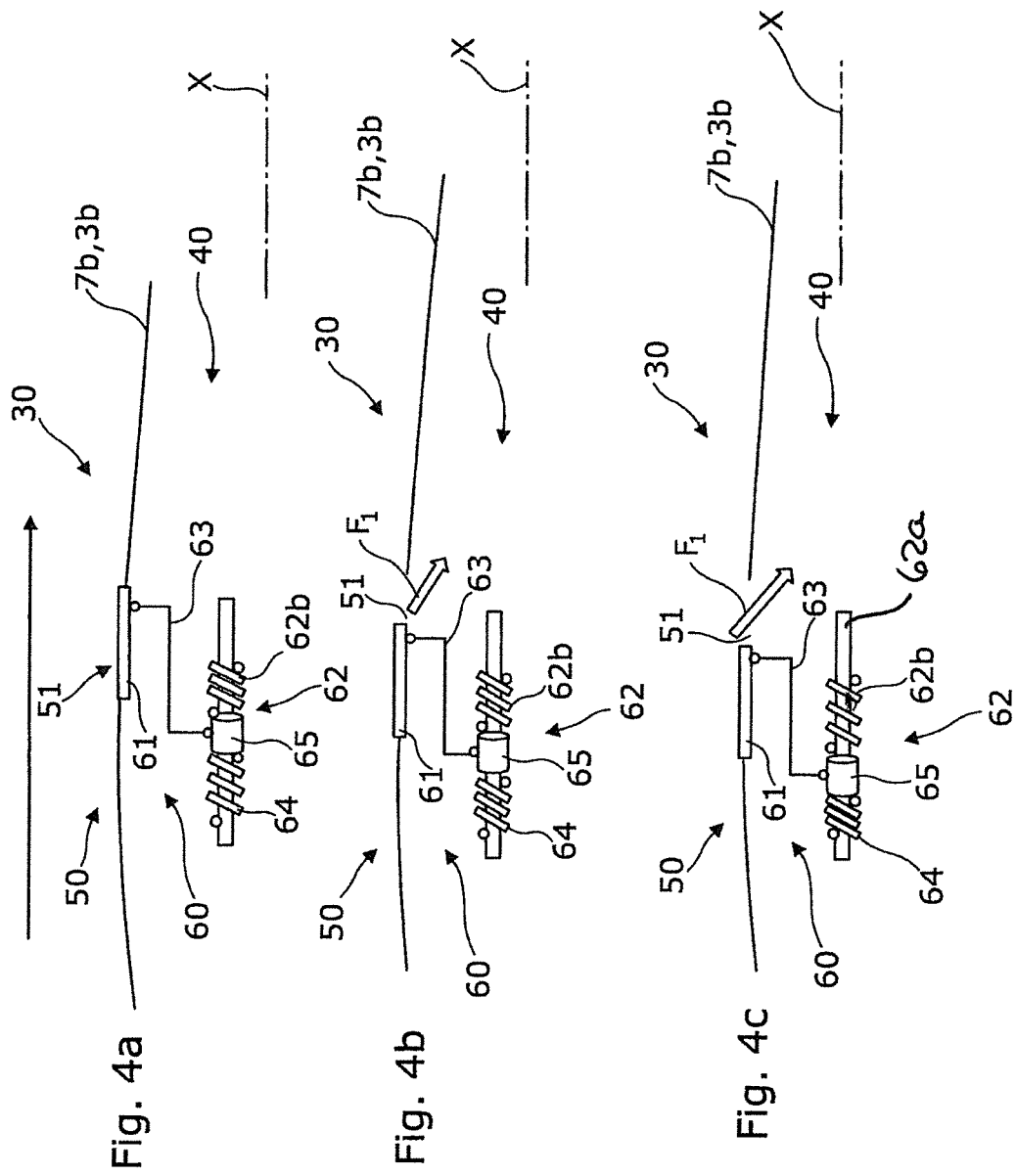

AIRCRAFT TURBOMACHINE COMPRISING A COMPARTMENT EQUIPPED WITH A VENTILATION ASSEMBLY

CROSS-REFERENCES TO RELATED APPLICATIONS

This application claims the benefit of the French patent application No. 1760009 filed on Oct. 24, 2017, the entire disclosures of which are incorporated herein by way of reference.

BACKGROUND OF THE INVENTION

The invention relates to an aircraft turbomachine of bypass type. More specifically, the invention relates to a ventilation assembly intended to ventilate a compartment of the turbomachine.

A bypass turbomachine generally comprises a plurality of compartments created in the thickness of its nacelle or of its interduct. A compartment comprises a plurality of heat-sensitive systems and needs to be ventilated so that the temperature in the compartment remains below a limit temperature. In order to do this, cold air from outside the turbomachine or the fan duct thereof is bled off via a scoop and circulates in the compartment.

The shape of the scoop generates drag which detracts from the performance of the aircraft in flight, notably in cruising phase. There is, therefore, a need for a ventilation assembly for ventilating the compartments of the turbomachine which has less of an impact on the in-flight performance of the aircraft.

SUMMARY OF THE INVENTION

It is an objective of the invention to overcome this problem and the invention relates to a turbomachine of bypass type comprising a nacelle centered on an axis and surrounding an interduct, the interduct and the nacelle between them defining a fan duct which extends along the axis, the turbomachine comprising at least one compartment created in the thickness of the interduct or of the nacelle, the compartment being separated from the fan duct by a cold wall and comprising at least one heat-sensitive element, the compartment further being equipped with a ventilation assembly comprising at least one ventilation opening made in the cold wall in order, in use, to cause air from the fan duct to enter the compartment, each ventilation opening comprising a passive-opening system arranged in the compartment, the system comprising a flap able to move between an open position in which the flap uncovers the opening and a closing-off position in which the flap closes off the opening, and a passive-actuation device of the flap for moving the flap between the two positions.

The ventilation assembly according to the invention makes it possible to protect the heat-sensitive elements of a compartment against thermal heating by being automatically deployable/retractable according to the need the elements have for cool air. The ventilation assembly has very little impact on the performance of the aircraft during cruising flight. Furthermore, the ventilation assembly according to the invention, which operates passively, is simple to implement because it comprises no active system of electrical or hydraulic type.

BRIEF DESCRIPTION OF THE DRAWINGS

The abovementioned features of the invention, together with others, will become more clearly apparent from reading the following description of some exemplary embodiments, the description being given in connection with the attached drawings, among which:

FIGS. 2a, 2b, 2c are schematic views depicting various states of the turbomachine compartment ventilation assembly illustrated in FIG. 1, according to a first embodiment of the invention;

FIGS. 3a, 3b, 3c are views similar to FIGS. 2a-c depicting various states of the turbomachine compartment ventilation assembly illustrated in FIG. 1, according to a second embodiment of the invention; and FIGS. 4a, 4b, 4c are views similar to FIGS. 2a-c depicting various states of the turbomachine compartment ventilation assembly illustrated in FIG. 1, according to a third embodiment of the invention.

DETAILED DESCRIPTION OF THE PREFERRED EMBODIMENTS

Figure 1:
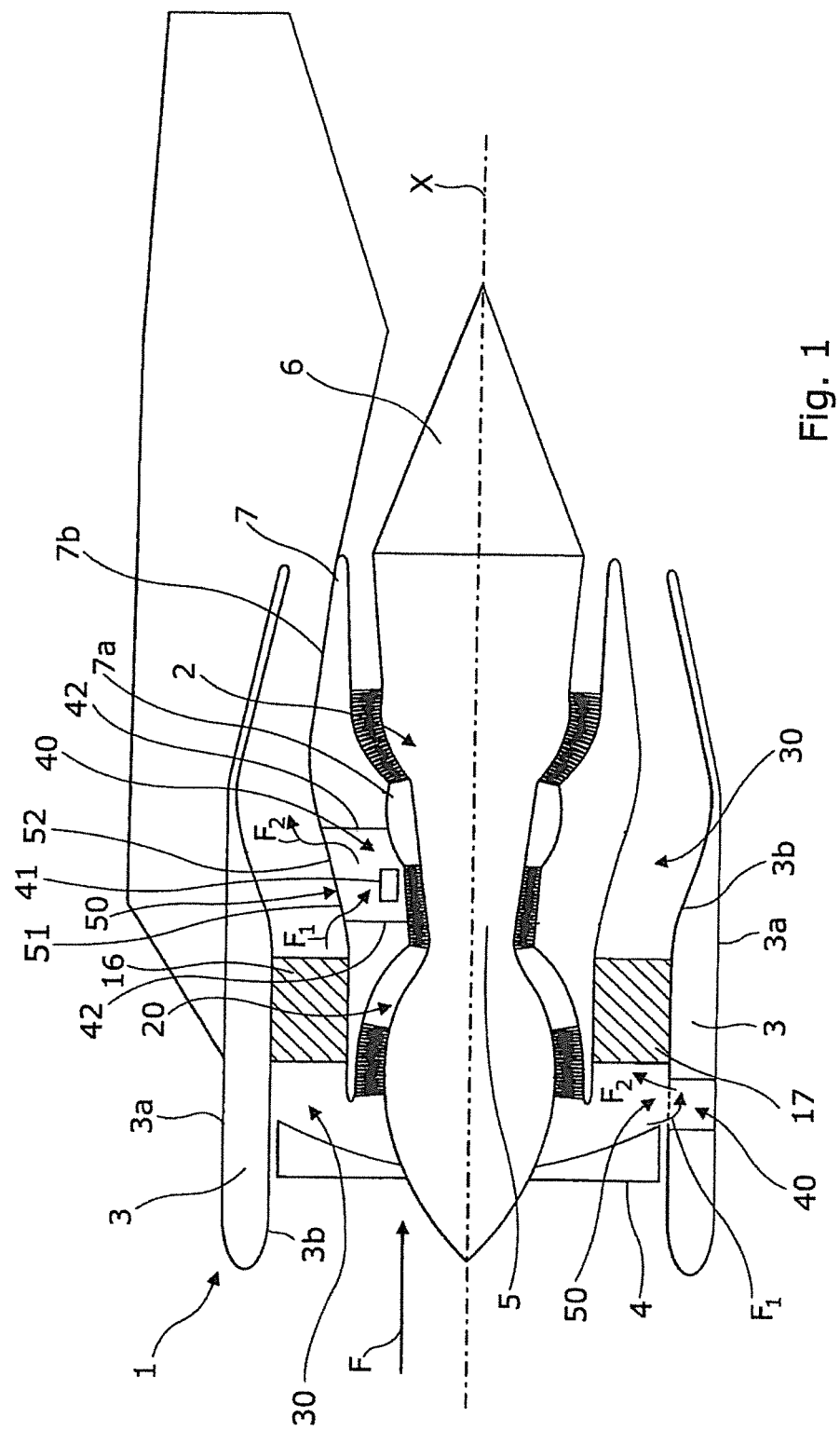
FIG. 1 is a schematic view of a turbomachine viewed in section along its longitudinal axis, the turbomachine comprising a compartment equipped with a ventilation assembly according to the invention created in the thickness of the nacelle, as well as a compartment equipped with a ventilation assembly according to the invention created in the thickness of the interduct.

With reference to FIG. 1, a bypass turbomachine 1 comprises an annular nacelle 3 centered on a longitudinal axis X (referred to as the engine axis) and surrounding an engine 2.

In the direction in which an airstream (arrow F) passing through the turbomachine 1 flows when this turbomachine is in operation, the engine 2 comprises, from upstream to downstream and centered on the engine axis X, a fan 4, an engine spool 5 and a jet pipe 6.

The engine spool 5 comprises elements that allow the fan 4 to be turned when the engine 2 is in operation. The turbomachine 1 additionally comprises, downstream of the fan 4, an annular interduct 7 concentric with the engine spool 5. The interduct 7 comprises an internal wall 7a which with the engine 2 delimits an annular duct for the flow of hot air 20 which extends along the engine axis X.

The nacelle 3 comprises an external wall 3a and an internal wall 3b and constitutes the outer casing of the turbomachine 1. The nacelle 3 surrounds the interduct 7 with which it is concentric. The external wall 3a of the nacelle forms the external wall of the turbomachine 1 whereas the internal wall 3b of the nacelle 3 delimits, with the external wall 7b of the interduct 7, an annular duct for the flow of cold air, referred to as the fan duct 30, which extends along the engine axis X.

The turbomachine comprises various fire resistant compartments 40 which are, for example, created in the thickness of the interduct 7. A plurality of heat-sensitive elements 41 is arranged in each compartment 40. One example of a heat-sensitive element is a component of a hydraulic circuit, of an oil circuit, of a hydraulic circuit or of an electrical circuit of the turbomachine.

The compartments 40 are separated from one another by firewalls 42. Each compartment of the interduct is thus delimited by the firewalls 42, the external wall 7b of the interduct 7 which separates the inside of the compartment 40 from the stream of cold air circulating in the fan duct 30 when the engine 2 is running and causing the fan 4 to turn, and the internal wall 7a of the interduct 7 which separates the inside of the compartment from the stream of hot air circulating along the annular duct for the flow of hot air 20.

In the known way, one compartment 40 of the turbomachine 1 is equipped with a ventilation assembly 50 comprising:

at least one through-opening, referred to as a ventilation opening 51, made in the external wall 7b of the interduct so as to cause cold air from the fan duct 30 to enter the compartment 40 (arrow F1), and at least one other through-opening, referred to as discharge opening 52, made downstream of the ventilation opening or openings 51 in order to remove the hot air from the compartment 40 towards the fan duct 30 (arrow F2).

According to the invention and with reference to FIGS. 2a-c, each ventilation opening 51 comprises a passive-opening system 60. According to one embodiment, the passive-opening system 60 comprises a flap 61 and a passive-actuation device 62 (arranged in the compartment 40) actuating the flap 61 between a closing-off position (FIG. 2a) and an open position (FIG. 2c) so as to ventilate the compartment 40. In the closing-off position, the flap 61 completely closes off the ventilation opening 51 whereas in the open position the flap 61 uncovers the ventilation opening so that cold air can enter the compartment 40 (arrow F1) when the engine 2 is running.

What is known by passive actuation is that the actuation occurs without recourse to external means such as, for example, hydraulic or pneumatic cylinders or electric motors.

The flap 61 takes the form of a component with a shape that complements that of the ventilation opening 51 and thus has, for example, a parallelepipedal shape (the flap is potentially curved in order to conform to the shape of the external wall 7b of the interduct) with its length oriented along the engine axis X of the turbomachine.

The flap takes the form of a Z-shaped arm comprising three distinct portions. The flap 61 is mounted articulated with a pivot connection (operating like a flap valve) to the compartment 40 about a pivot axis A perpendicular to the engine axis X.

The flap has a first plate 61a and a second plate 61b which are mutually parallel and joined together by an intermediate component 61c which is inclined with respect to the planes of the two plates. The first plate 61a has a shape that complements that of the ventilation opening 51 and is, for example, parallelepipedal in shape with its length oriented along the engine axis X.

When the flap 61 moves into its open position, the first plate 61a extends more deeply into the compartment in order to uncover the ventilation opening 51.

The pivot connection is, for example, formed by an attachment of the hinge type (not depicted) fixed on the one hand to the external wall 7b (on the compartment side) and on the other hand to the first plate 61a (on the side of the face that faces towards the compartment 40). As an alternative, the pivot connection is formed, on either side of the flap 61, by a pin (not depicted) passing through a hole made in a clevis (not depicted) arranged on the external wall 7b of the interduct (on the compartment side) and in a lateral edge face of the flap 61.

The passive-actuation device 62 comprises a fixed tube 62a arranged inside the compartment 40 and a spring 62b surrounding the tube 62a in the region of a portion of the tube 62a, referred to as the displacement portion, perpendicular to the engine axis X. The spring 62b is made of a shape memory alloy which is heat sensitive in as much as it expands or contracts according to the temperature to which it is subjected.

The tube 62a is said to be fixed because it is fixed to the compartment 40 via, for example, a connecting flange.

The spring 62b is arranged between the flap 61 and the external wall 7b of the interduct so that it does not clutter the compartment 40. The second plate 61b of the flap 61 may comprise a recess 61d in order to allow the tube 62a to pass, if that proves by construction to be needed.

The spring 62b is trained to compress continuously towards an extreme compressed position (FIG. 2c) when its temperature rises above a threshold temperature and, on the other hand, to expand continuously when its temperature tends towards the threshold temperature. The extreme expanded position (FIG. 2a) of the spring 62b is reached when its temperature is close to the threshold temperature.

The spring 62b has a first end fixed to a fixed element of the compartment 40 (for example to the tube 62a, to a firewall 42, the external wall 7b of the interduct) and a second end fixed to the second plate 61b of the flap (on the side of its face that faces towards the compartment 40).

In use, when the temperature of the air in the compartment 40 exceeds the threshold temperature, the spring 62 compresses and its second end moves closer to its fixed first end, causing the flap 61 to move (FIG. 2b) towards its open position (FIG. 2c) which is reached when the spring 62 is fully compressed. By contrast, as the spring expands when the temperature in the compartment 40 tends towards the threshold temperature, the second end of the spring moves away from the first end causing the flap to move (FIG. 2b) towards its closing-off position (FIG. 2a) which is reached when the spring 62b is fully expanded.

The characteristics of the spring 62b (materials, material thicknesses, width of sheets, length of strip, etc.) are chosen so that the threshold temperature is of the order of 150° C. The spring is, for example, made of pairs of metal chosen from one of the following combinations: titanium and Cr—Ni—Fe (chrome, nickel-iron) alloy or nickel and iron, or copper and aluminum alloy, or copper and zinc.

The ventilation assembly 50 according to the invention allows the ventilation opening 51 to be opened with a degree of opening that is suited to the ventilation requirements of the compartment 40 so as not to needlessly impact on the aerodynamic performance of the turbomachine 1, particularly at the engine speed used during the cruising phase. Thus, during the cruising phase, the flap 61 is in an intermediate position (FIG. 2b) or in the closing-off position (FIG. 2a), and the drag induced at the ventilation opening 51 is respectively limited or zero compared with the instances in which the flap is in the open position (FIG. 2c).

The open position (FIG. 2c) is used when the engine 2 is at idling speed on the ground when the flow rate of cold air blown by the fan 4 is small in comparison with the flow rate of cold air blown by the fan 4 in flight. The drag induced at the ventilation opening 51 when the flap 61 is in the open position is relatively high, but has no impact on the performance of the airplane in flight.

In another embodiment of the invention and in connection with FIGS. 3a-c, the flap 61 is mounted about a pivot axis A perpendicular to the engine axis X between a closing-off position (FIG. 3a) in which the flap 61 completely closes off the ventilation opening 51 and an open position (FIG. 3c) in which the flap 61 moves deeper into the compartment 40 to uncover the ventilation opening 51.

The pivot connection is, for example, formed by an attachment of the hinge type fixed on the one hand to the external wall 7b of the interduct (on the compartment 40 side) and on the other hand to the plate 61 (on the side of the face oriented towards the compartment 40).

The passive-actuation device 62 comprises, arranged inside the compartment 40, a fixed tube 62a with one end in contact with a heat-sensitive element 41 of the compartment 40, and further comprises:

a return spring 64 (loaded in compression in the example illustrated in FIG. 3), (made from a metallic material that does not have shape memory);

a spring 62b made from a heat-sensitive shape memory alloy which surrounds the tube 62a.

an intermediate component 65, for example of cylindrical shape, push-fitted onto the tube 62a between the two springs 64, 62b and which is fixed to the flap 61 (on the side of the face of the flap 61 that faces towards the compartment 40), by a rod 63 articulated both to the intermediate component 65 and the flap 61. The rod 63 is preferably articulated to the flap 61 as far away as possible from the pivot axis A in order to obtain a significant lever arm.

The springs 64 and 62b and the intermediate component 65 are push-fitted onto a portion of the tube 62a, referred to as the displacement portion, running parallel to the engine axis X.

In the example illustrated in FIGS. 3a-c, the layout of the passive-actuation device 62 is such that the return spring is situated upstream of the spring 62b in the direction in which an airstream (arrow F) passing through the turbomachine 1 flows when this turbomachine is in operation.

The return spring 64 has a first end fixed to a fixed element of the compartment 40 (for example the tube 62a, a firewall 42, the external wall 7b) and a second end fixed to the intermediate component 65. The spring 62b for its part has a first end fixed to a fixed element of the compartment and a second end fixed to the intermediate component 65.

The spring 62b is trained to expand continuously to an extreme expanded position (FIG. 3c) when its temperature rises above a threshold temperature and, on the other hand, to compress continuously as its temperature tends towards the threshold temperature. The extreme compressed position (FIG. 3a) of the spring 62b is reached when the temperature of the spring is close to the threshold temperature.

The springs 62b, 64 are dimensioned so that the return force of the spring 64 is greater than the force exerted by the spring 62b when the latter is at the threshold temperature, or at a temperature below this threshold temperature.

In use, when the temperature in the compartment 40 exceeds the threshold temperature, the spring 62b expands and its second end moves away from its fixed first end, causing a movement of the intermediate component 65 and therefore of the flap 61 towards its open position (FIG. 3b) which will be reached when the spring is fully expanded (FIG. 3c).

By contrast, when the spring 62b compresses when the temperature in the compartment 40 tends towards the threshold temperature, the second spring 64 exerts a force which compresses the spring 62b all the more: the intermediate component 65 moves towards the first end of the spring 64b, thereby causing the flap 61 to move towards its closing-off position (FIG. 3b) which is reached when the first spring is fully compressed (FIG. 3a).

In this embodiment, the memory effect of the shape memory spring 62b is assisted by the return spring 64 in order to obtain an additional force during the movement of the flap 61 into its closing-off position during which the air (arrow F1) is applying a force that tends to oppose this movement. Such a configuration will thus be preferred for applications to large-sized ventilation openings 51 so as not to impair the shape memory spring 62b.

In another embodiment of the invention and in connection with FIGS. 4a-c, the flap 61 is a sliding flap which slides along the engine axis X on guideways (not depicted) arranged inside the compartment 40 on the external wall 7b. The sliding flap 61 is able to move between a closing-off position (FIG. 4a) in which the flap 61 completely closes off the ventilation opening 51 and an open position (FIG. 4c) in which the flap completely uncovers the ventilation opening so that air can enter the compartment.

The passive-actuation device 62 for actuating the sliding flap 61 is, for example, identical to the one described in connection with FIGS. 3a-c.

In use, when the temperature in the compartment 40 exceeds the threshold temperature, the spring 62b expands and its second end moves away from its fixed first end, causing the intermediate component 65 and therefore the flap 61 to move into its open position (FIG. 4b) which is reached when the spring 62b is fully expanded (FIG. 4c).

By contrast, when the spring 62b compresses, the second spring 64 exerts a force which compresses the spring 62b all the more: the intermediate component 65 moves towards the first end of the spring 64b thereby causing the flap 61 to move towards its closing-off position (FIG. 4b) which is reached when the first spring is fully compressed (FIG. 4a).

In another embodiment of the invention and in connection with FIGS. 5a-e, the passive-opening system 60 comprises a mechanism 61a to open or close the opening 51 and a passive-actuation device 62 (arranged in the compartment 40) actuating the mechanism 61a between a closing-off position and an open position so as to ventilate the compartment 40. In the closing-off position, the mechanism 61a completely closes off the ventilation opening 51 whereas in the open position the mechanism 61a uncovers the ventilation opening so that cold air can enter the compartment 40 when the engine 2 is running.

The passive-actuation device 62, based on the principle of a jack, comprises, arranged inside the compartment 40, a fixed tube 62a with one end in contact with (or in a heat transfer relationship with) a heat-sensitive element 41 of the compartment 40, and further comprises:

a return spring 64 (loaded in compression in the example illustrated in FIG. 5a), (made from a metallic material that does not have shape memory) which surrounds the tube 62a;

a spring 62b made from a heat-sensitive shape memory alloy which surrounds the tube 62a:

a frame 65a, for example of cylindrical shape, push-fitted onto the tube 62a surrounding the return spring 64 and with an end wall 65b positioned between the two springs 64, 62b and which is fixed to the mechanism 61a ; and a piston 62c, for example of cylindrical shape, push-fitted onto the frame 65a, that can translate between the return spring 64 and the frame 65a, and which is fixed to a first end of the return spring 64, and to the mechanism 61a.

The springs 64 and 62b and the frame 65a are push-fitted onto a portion of the tube 62a, referred to as the displacement portion, running parallel to the engine axis X.

Figure 5A:
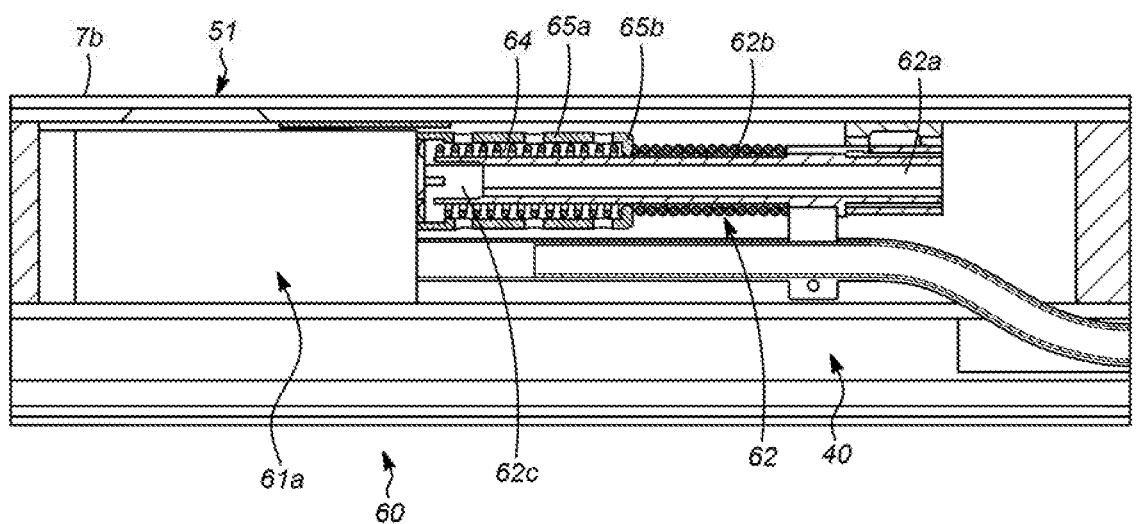
FIGS. 5a, 5b, 5c, 5d and 5e are views very similar to FIGS. 4a, 4b and 4c depicting various states of the turbomachine compartment ventilation assembly illustrated in FIG. 1, according to a fourth and fifth embodiment of the invention.

In the example illustrated in FIG. 5a, the layout of the passive-actuation device 62 is such that the return spring 64 is situated upstream of the spring 62b in the direction in which an airstream (arrow F) passing through the turbomachine 1 flows when this turbomachine is in operation.

The return spring 64 has the first end fixed to the piston 62c and a second end fixed to the frame end wall 65b. The spring 62b for its part has a first end fixed to a fixed element of the compartment and a second end fixed to the frame end wall 65b.

The spring 62b is trained to expand continuously to an extreme expanded position (FIGS. 5b, 5c) when its temperature rises above a threshold temperature and, on the other hand, to compress continuously as its temperature tends towards the threshold temperature. The extreme compressed position (FIGS. 5d, 5e) of the spring 62b is reached when the temperature of the spring is close to the threshold temperature.

The springs 62b, 64 are dimensioned so that the return force of the spring 64 is greater than the force exerted by the spring 62b when the latter is at the threshold temperature, or at a temperature below this threshold temperature.

In use, when the temperature in the compartment 40 exceeds the threshold temperature, the spring 62b expands and its second end moves away from its fixed first end, causing a movement of the intermediate component 65 and therefore of the mechanism 61a towards its open position (FIGS. 5b, 5c) which will be reached when the spring is fully expanded.

By contrast, when the spring 62b compresses when the temperature in the compartment 40 tends towards the threshold temperature, the second spring 64 exerts a force which compresses the spring 62b all the more: the frame 65a moves towards the first end of the spring 64b, thereby causing the mechanism 61a to move towards its closing-off position (FIGS. 5d, 5e) which is reached when the first spring is fully compressed.

In this embodiment, the memory effect of the shape memory spring 62b is assisted by the return spring 64 in order to obtain an additional force during the movement of the flap 61 into its closing-off position during which the air (arrow F1) is applying a force that tends to oppose this movement. Such a configuration will thus be preferred for applications to large-sized ventilation openings 51 so as not to impair the shape memory spring 62b.

Figure 5B:
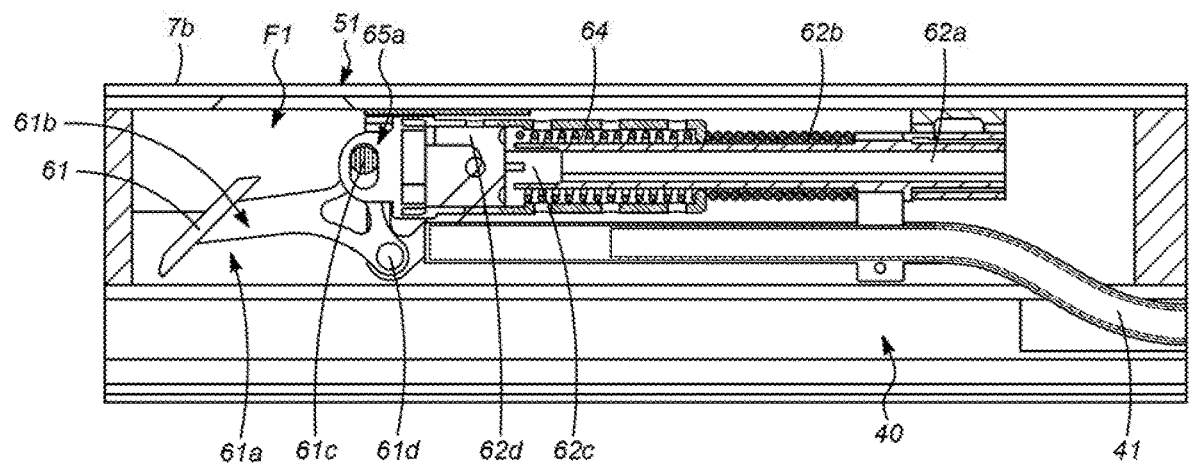

The opening and closing mechanism 61a is shown in an embodiment in FIG. 5b as including a flap 61 carried on an arm 61b that has a first pivot axis 61c connecting the arm to the frame 65a and a second pivot axis 61d connecting the arm to a fixed portion of the compartment 40. When the shape memory spring 62b expands, the piston 62c is moved to the left in FIG. 5b, thereby moving the frame 65a, via a translating element 62d, to the left and causing the arm 61b to pivot about the second pivot axis 61d in a counterclockwise direction, thereby moving the flap 61 away from the opening 51. When the temperature in the compartment tends towards the threshold temperature, the return spring 64 exerts a force which compresses the spring 62b, thereby causing the arm 61b to pivot about the second pivot axis 61d in a clockwise direction, thereby moving the flap 61 towards the opening 51.

Figure 5C:
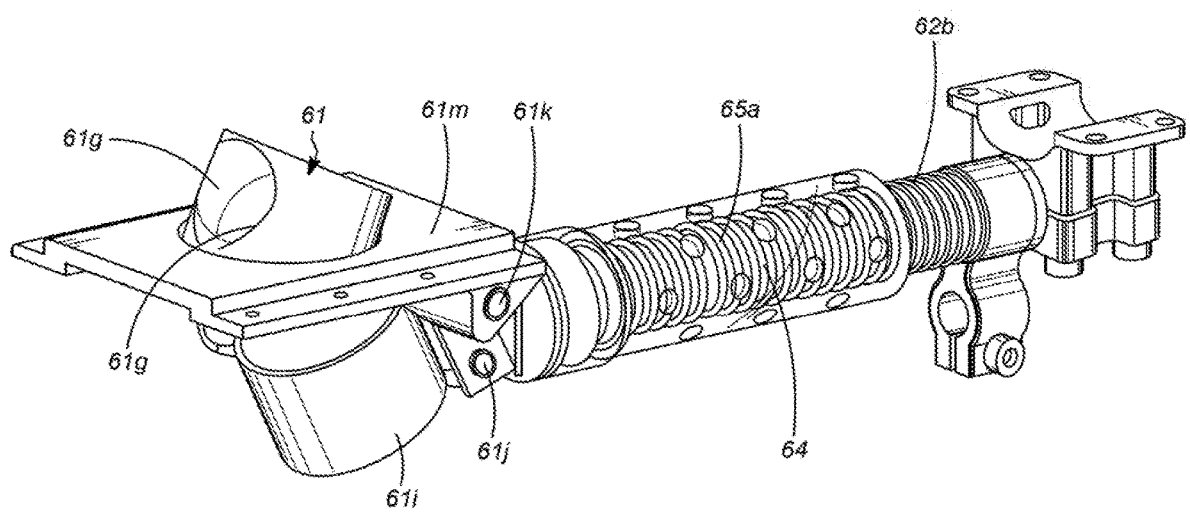
Figure 5D:
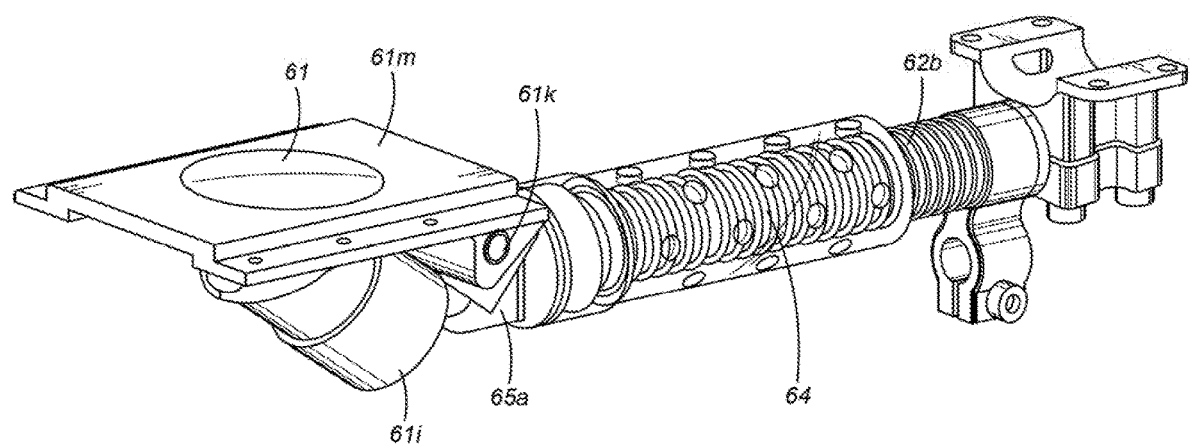
Figure 5E:
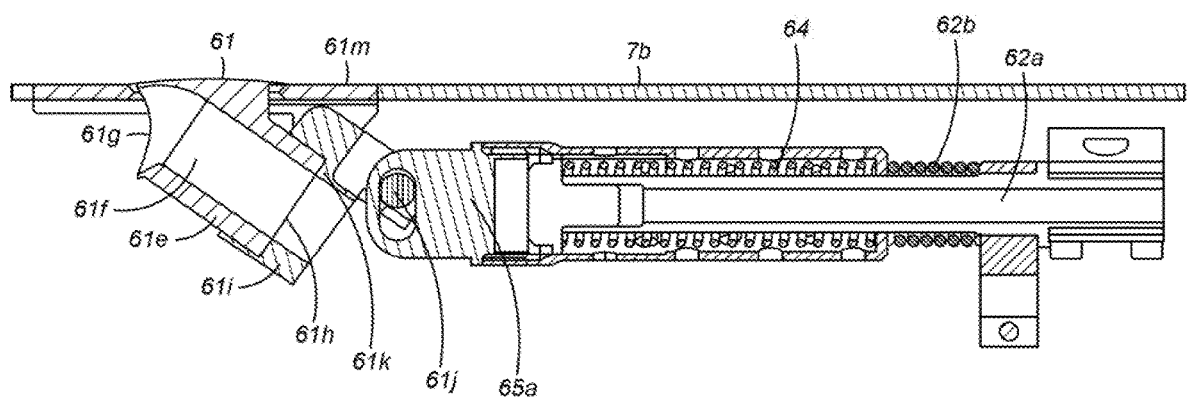

The opening and closing mechanism 61a is shown in an embodiment in FIGS. 5c-e as including a flap 61 that is moved out of and away from the compartment 40 to open the opening 51, rather than into the compartment. In this embodiment, the flap 61 comprises a hollow body 61e having an interior passage 61f extending between a first opening 61g and a second opening 61h. The body 61e is secured to a bracket 61i that is pivotally connected at a pivot point 61j to the frame 65a and pivotally connected at a pivot point 61k to the outer wall 7b.

When the spring 62b expands, the frame 65a is pressed to the left in FIG. 5e, causing the bracket 61i, and therefore the flap body 61e to pivot clockwise about the pivot 61k, thereby opening the opening 51 in the outer wall 7b. As the flap body 61e pivots clockwise, the flap 61 lifts above the outer wall 7b, exposing the first opening 61g which acts as a scoop to direct airflow through the interior passage 61f and out the second opening 61h to the interior of the compartment 40. When the temperature in the compartment tends towards the threshold temperature, the return spring 64 exerts a force which compresses the spring 62b, thereby causing the frame 65a to move to the right, thereby causing the bracket 61i and the flap body 61e to pivot counterclockwise to close the opening 51. A separate interface element 61m may be provided in the opening 51 to provide a seal with the flap 61 in the closed position.

Figure 6A:
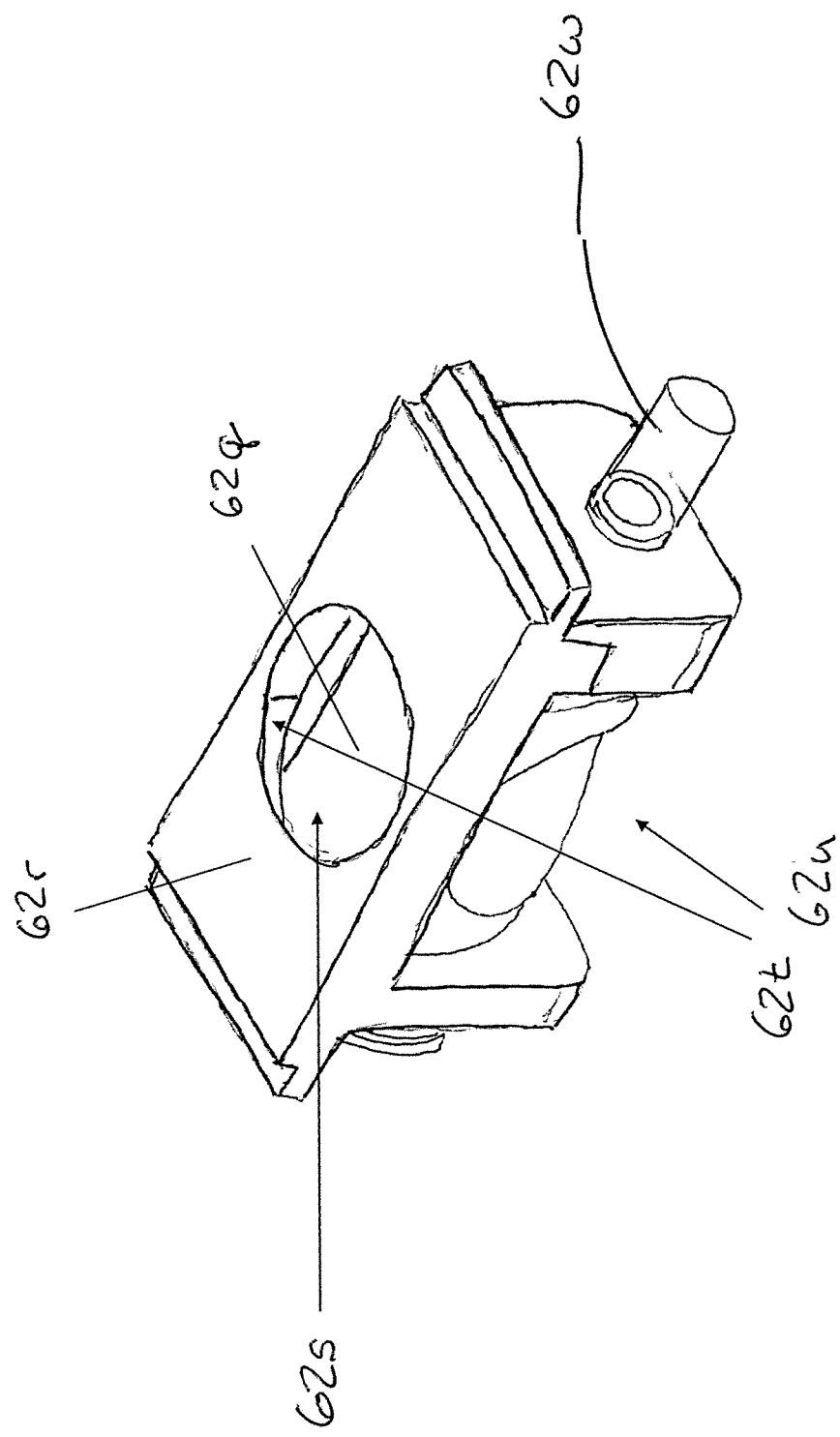
FIGS. 6a, 6b and 6c are views very similar to FIGS. 5a, 5b, 5c, 5d and 5e depicting various states of the turbomachine compartment ventilation assembly illustrated in FIG. 1, according to a sixth embodiment of the invention.
Figure 6B:
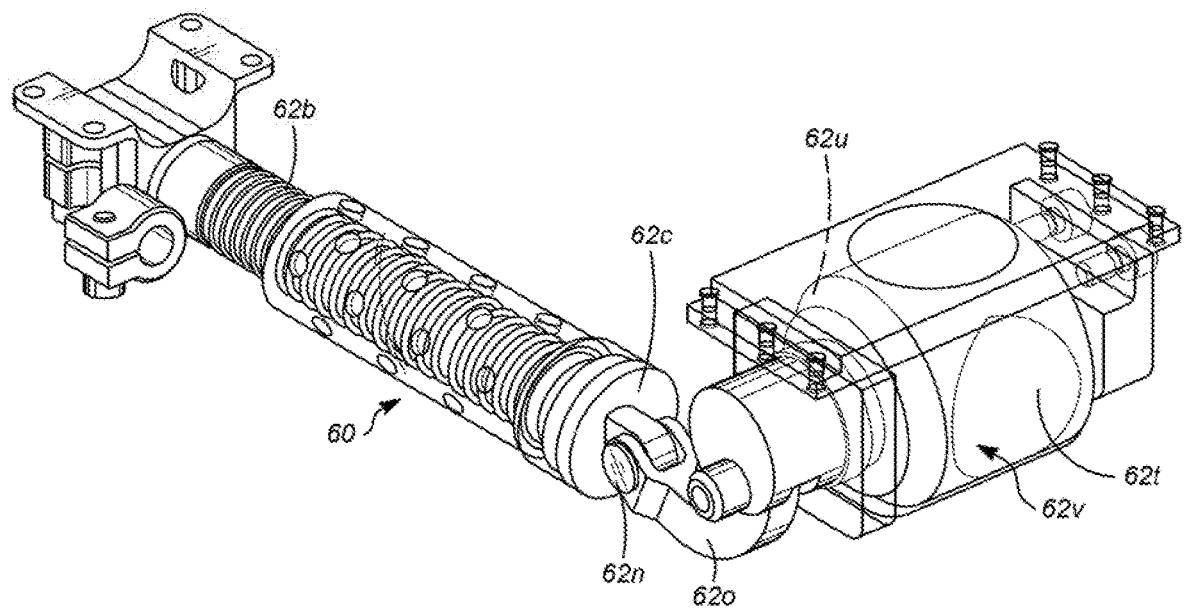
Figure 6C:
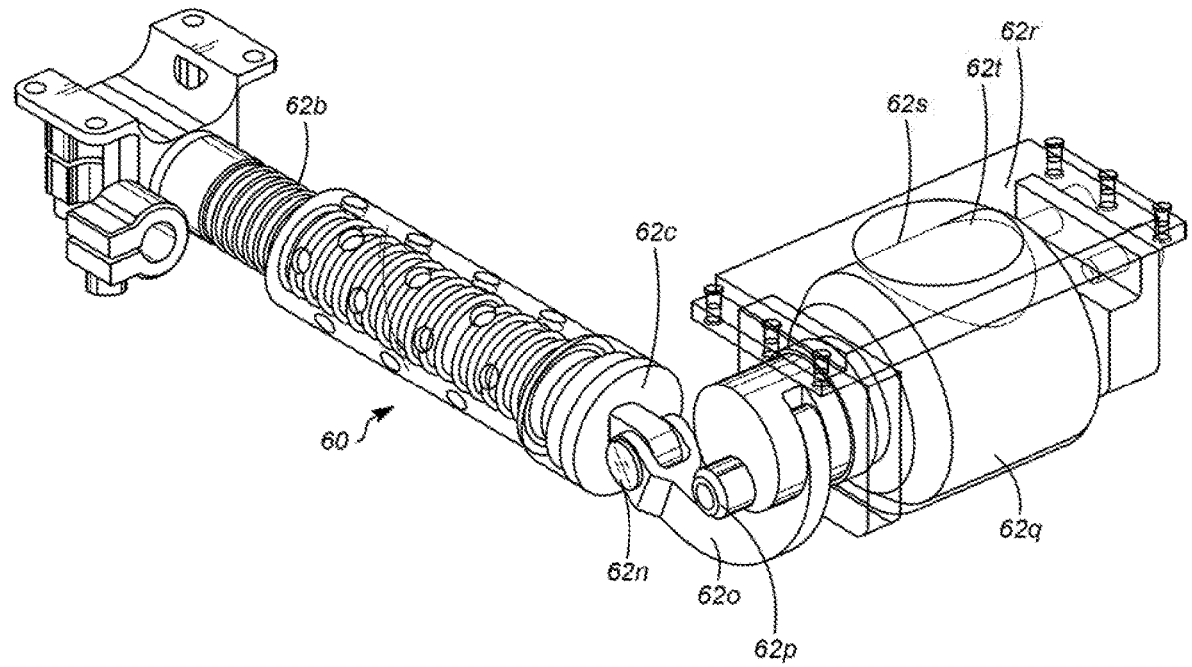

Another embodiment of the passive-opening system 60 is shown in FIGS. 6a-c. This embodiment utilizes the same passive-actuation device 62, based on the principle of a jack, as described above with respect to FIGS. 5a-e. In this embodiment, the piston 62c is pivotally attached at a pivot axis 62n to a crank arm 62o which, in turn, is pivotally attached at a pivot axis 62p in an eccentric manner to a flap in the form of a cylinder 62q rotatably carried in a housing 62r. The housing 62r has an opening 62s which concentrically aligns with the opening 51 in the outer wall 7b. The cylinder 62q includes two openings 62t and 62u and a central passage 62v connecting the openings. When the spring 62b expands upon the temperature exceeding the threshold, the piston 62c moves the crank arm 62o to the right in FIGS. 6b and 6c, thereby causing the cylinder 62q to rotate on an axle 62w (FIG. 6a) in the housing 62r. As the cylinder 62q rotates, the opening 62t will align with the housing opening 62s, allowing a flow of air into the cylinder, through the passage 62v and out the opening 62u into the compartment 40. When the temperature in the compartment 40 tends towards the threshold temperature, the return spring 64 exerts a force which compresses the spring 62b, thereby causing the frame 65a and piston 62c to move to the left in FIGS. 6b and 6c, thereby causing the crank arm 62o to move to the left, thereby rotating the cylinder in a clockwise direction to move the opening 62t out of alignment with the housing opening 62s, thereby closing the opening 51. Thus, the cylindrical flap 62q is configured to move between an open position in which the cylindrical flap 62q uncovers the opening 51 and a closing-off position in which the cylindrical flap closes off the opening 51. This movement is achieved via the passive-actuation device 62 of the cylindrical flap 62q for moving the cylindrical flap 62q between the two positions.

Furthermore, and although described for an application to a compartment of the interduct 7, the invention could be applied to any other compartment of the turbomachine 1 which is delimited by firewalls and a wall which separates the inside of the compartment from a stream of cold air, the movement of which is consequential on the operation of the engine 2. Thus, with reference to FIG. 1, the invention also finds an application in an assembly for ventilating a compartment 40 created in the thickness of the nacelle 3 (the ventilation opening 51 is in this case made in the internal wall 3b as illustrated in FIG. 1, in the lower part of the nacelle) or in bifurcations 16, 17 (the ventilation opening in this case is made in a wall of the bifurcation situated in the fan duct 30) which are situated in the fan duct 30 and which provide the turbomachine 1 with mechanical cohesion by connecting the nacelle 3 and the interduct 7 to one another.

In an alternative form of the embodiments described hereinabove, the tube 62a is in contact with at least one heat-sensitive element 41 of the compartment 40 so as to act like a heat pipe which conveys some of the heat of the heat-sensitive element 41 along its length.

The shape memory spring 62b is in contact with the tube 62a in the region of the displacement portion thereof.

The spring 62b is thus brought to the temperature of the displacement portion of the tube 62a. This alternative form therefore offers the advantage of accelerating the compression or expansion of the spring 62b and therefore the movement of the flap 61.

In order to optimize heat conduction, the tube 62a is, for example, a copper tube or a hollow copper tube filled with a heat-transfer fluid. The tube may also be made of aluminum, titanium or even stainless steel.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A turbomachine of bypass type comprising:
a nacelle centered on an axis and surrounding an interduct, the interduct and the nacelle between them defining a fan duct which extends along the axis;
at least one compartment formed in a thickness of the interduct or of the nacelle, the compartment being separated from the fan duct by a cold wall and comprising at least one heat-sensitive element, the compartment further being equipped with a ventilation assembly comprising at least one ventilation opening made in the cold wall in order, in use, to cause air from the fan duct to enter the compartment,
wherein each ventilation opening comprises a passive-opening system arranged in the compartment, the system comprising:
a flap configured to move between an open position in which the flap uncovers the opening, and a closing-off position in which the flap closes off the opening,
a passive-actuation device of the flap for moving the flap between the two positions, the passive-actuation device comprising
a tube and a spring made of a heat-sensitive shape memory alloy, the spring surrounding the tube and having a first end fixed and a second end mechanically connected to the flap to move the flap between the two positions according to a temperature of the spring.

2. The turbomachine according to claim 1, wherein the flap is fixed with a pivot connection to the compartment about a pivot axis perpendicular to the axis, the flap moving more deeply into the compartment when moved from the closing-off position into the open position.

3. The turbomachine according to claim 1, wherein the flap slides in a direction of the axis.

4. The turbomachine according to claim 1, wherein the shape memory spring surrounds a portion of the tube, which portion runs parallel to the axis.

5. The turbomachine according to claim 2, wherein the device comprises a tube and a spring made of a heat-sensitive shape memory alloy, the spring surrounding the tube and having a first end fixed and a second end mechanically connected to the flap to move the flap between the two positions according to a temperature of the spring and wherein a shape memory spring surrounds a portion of the tube, which portion runs perpendicular to the axis.

6. The turbomachine according to claim 4, wherein the passive-actuation device further comprises, push-fitted onto the portion of the tube:
a return spring which also has a fixed first end,
an intermediate component surrounding the tube and arranged between the two springs and which is fixed to the flap, the second end of the shape memory spring and a second end of the return spring being fixed to the intermediate component on either side thereof.

7. The turbomachine according to claim 5, wherein the flap takes a form of a Z-shaped arm having a first plate and a second plate which are mutually parallel, the two plates being joined by an intermediate component which is inclined with respect to planes of the two plates, the first plate having a shape that complements that of the ventilation opening and being configured to close off or uncover the ventilation opening, the shape memory spring being arranged between the cold wall and the second plate and having its second end mechanically connected to the second plate.

8. The turbomachine according to claim 1, wherein the tube is in contact with a heat-sensitive element comprised in the compartment and wherein a spring made from a heat-sensitive shape memory alloy is in contact with the tube.

9. The turbomachine according to claim 1, wherein the flap is fixed with a pivot connection to the compartment about a pivot axis perpendicular to the axis, the flap moving out of the compartment when moved from the closing-off position into the open position.

10. The turbomachine according to claim 1, wherein the flap has a cylindrical shape.

11. The turbomachine according to claim 1, wherein the tube comprises a heat pipe.

12. A turbomachine of bypass type comprising:
a nacelle centered on an axis and surrounding an interduct, the interduct and the nacelle between them defining a fan duct which extends along the axis;
at least one compartment formed in a thickness of the interduct or of the nacelle, the compartment being separated from the fan duct by a cold wall and comprising at least one heat-sensitive element, the compartment further being equipped with a ventilation assembly comprising at least one ventilation opening made in the cold wall in order, in use, to cause air from the fan duct to enter the compartment,
wherein each ventilation opening comprises a passive-opening system arranged in the compartment, the system comprising:
a cylindrical flap configured to rotate between an open position in which the flap uncovers the opening, and a closing-off position in which the flap closes off the opening, a passive-actuation device of the cylindrical flap for rotating the cylindrical flap between the two positions, the passive-actuation device comprising
 a tube and a spring made of a heat-sensitive shape memory alloy, the spring surrounding the tube and having a first end fixed and a second end mechanically connected to the cylindrical flap to move the cylindrical flap between the two positions according to a temperature of the spring.

\* \* \* \* \*